(12) United States Patent
Davis et al.

(10) Patent No.: US 11,041,678 B2
(45) Date of Patent: Jun. 22, 2021

(54) COOLING TOWER FOR COOLING A LIQUID WITH A GAS

(71) Applicant: Fluid Technologies (Environmental) Limited, Kingston Upon Thames (GB)

(72) Inventors: Howard Paul Davis, Richmond (GB); David William Missions, Ashford (GB)

(73) Assignee: Fluid Technologies (Environmental) Limited, Kingston Upon Thames (GB)

(*) Notice: Subject to any disclaimer, the term of this patent is extended or adjusted under 35 U.S.C. 154(b) by 188 days.

(21) Appl. No.: 16/315,869

(22) PCT Filed: Jul. 13, 2017

(86) PCT No.: PCT/GB2017/000110
§ 371 (c)(1),
(2) Date: Jan. 7, 2019

(87) PCT Pub. No.: WO2018/011539
PCT Pub. Date: Jan. 18, 2018

(65) Prior Publication Data
US 2019/0212068 A1    Jul. 11, 2019

(30) Foreign Application Priority Data
Jul. 14, 2016  (GB) .................................. 1612407

(51) Int. Cl.
*F28D 13/00* (2006.01)
*B01F 3/04* (2006.01)
(Continued)

(52) U.S. Cl.
CPC .......... *F28D 13/00* (2013.01); *B01F 3/04078* (2013.01); *B01J 8/24* (2013.01);
(Continued)

(58) Field of Classification Search
CPC .... F28D 13/00; F28C 1/02; F28C 3/16; B01F 3/04; B01F 3/04078
See application file for complete search history.

(56) References Cited

U.S. PATENT DOCUMENTS 3,793,809 A * 2/1974 Tomany ................. B01D 47/10
                                                                  95/211
5,376,165 A    12/1994 Ruff et al.
5,588,986 A    12/1996 Davis et al.

FOREIGN PATENT DOCUMENTS

SU        975026 A  * 11/1982  ............... B01D 3/42
WO    03035246 A1    5/2003

OTHER PUBLICATIONS

K.N. Seetharamu et al., "The Effect of Size on the Performance of a Fluidized Bed Cooling Tower", Warme und Stoffubertragung, vol. 26, No. 1 (1990), pp. 17-21.
(Continued)

*Primary Examiner* — Robert A Hopkins
(74) *Attorney, Agent, or Firm* — Iandiorio Teska & Coleman, LLP

(57) ABSTRACT

A cooling tower (2) for cooling a liquid (4) with a gas (6), which cooling tower (2) comprises: (i) a vessel (8) for receiving the gas (6) passing upwardly and the liquid (4) passing downwardly, with the liquid (4) being hotter than the gas (6); (ii) a gas outlet (4) which is at a top portion (16) of the vessel (8) and which is for allowing the gas (6) to pass out of the vessel (8), (iii) a support member (20) which is positioned across a bottom portion (22) of the vessel (8): (iv) a plurality of apertures (24) which are in the support member (20) and through which the gas (6) and the liquid (4) are able to pass; (v) a fluidised bed (26) of packing elements (28) on the support member (20); (vi) liquid emitting means (30) which is positioned in the vessel (8) above the fluidised bed (26), and which is for emitting alas liquid (4) to be cooled (Continued)

such the liquid (4) passes downwardly towards the fluidised bed (26); (vii) pump means (32) for pumping the liquid to the liquid emitting means (30); and (viii) a fan (34) for blowing the pas upwardly through the fluidised bed (26), and the cooling tower (2) being such that it includes (ix) control means (31) for controlling (a) the velocity of the gas through die vessel (8), and (b) the liquid to gas ratio in the vessel (8), whereby the fluidised bed (26) is caused to operate at a tumbling rate which when combined with selected pre-fluidised packing height causes an approach temperature of below 10° F. (5.6° C.); (x) wherein the tumbling rate is controlled by a combination of controlled gas velocity and liquid to gas ratio creating turbulent mixing and tumbling of packing elements (28) in the fluidised bed (26); (xi) and wherein the pre-fluidised height of the fluidised bed (26) is from 0.15-1.0 m.

13 Claims, 8 Drawing Sheets

(51) Int. Cl.
*B01J 19/30* (2006.01)
*F28F 27/00* (2006.01)
*F28C 1/02* (2006.01)
*F28C 3/16* (2006.01)
*F28F 25/02* (2006.01)
*B01J 8/24* (2006.01)
*F28F 25/06* (2006.01)

(52) U.S. Cl.
CPC ............ *B01J 19/30* (2013.01); *B01J 19/305* (2013.01); *F28C 1/02* (2013.01); *F28C 3/16* (2013.01); *F28F 25/02* (2013.01); *F28F 25/06* (2013.01); *F28F 27/003* (2013.01); *B01J 2219/30207* (2013.01); *B01J 2219/30211* (2013.01); *B01J 2219/30253* (2013.01); *B01J 2219/30466* (2013.01)

(56) References Cited

OTHER PUBLICATIONS

K.N. Seetharamu et al., "Performance of a Fluidized Bed Cooling Tower Using Bed Materials of Various Configuration", Warme und Stoffubertragung, vol. 22, No. 3-4 (1988), pp. 219-222.
N. Sisupalan et al., "Heat Transfer and Pressure Drop in Fluidized Bed Cooling Tower", Warme und Stoffubertragung, vol. 27, No. 8 (1992), pp. 499-503.
Hisham El-Dessouky, "Thermal and Hydraulic Performance of a Three-Phase Fluidized Bed Cooling Tower", Experimental Thermal and Fluid Science, vol. 6, No. 4 (1993), pp. 417-426.
Ronald A. Barile. "Turbulent Bed Cooling Tower", Environmental Protection Technology Series, EPA 660/2-75-027, May 1975, 35 pages.

* cited by examiner

COOLING TOWER FOR COOLING A LIQUID WITH A GAS

This invention relates to a cooling tower for cooling a hotter liquid with a cooler gas.

Cooling towers for cooling a liquid with a gas are well known. The cooling towers are used in many industrial applications primarily to remove unwanted heat from hot processes. The liquid to be cooled depends upon the particular industrial application in which the cooling tower is being used. Typically the liquid to be cooled is water or oil. Similarly, the gas that is used to cool the liquid depends upon the type of industrial application for the cooling tower. Typically the gas will be air but the gas may alternatively be, for example, oxygen, nitrogen or carbon dioxide.

The known cooling towers suffer from the disadvantages that they are bulky, which causes them to occupy otherwise valuable space, and that they cannot achieve "approach temperatures" (the minimum temperature difference between cooled outlet liquid and cooler inlet gas) below 10° F., which limits their efficiency. Because the cooling towers are used in many different industrial applications, the problems of the cooling towers being bulky and unable to cool the liquid below a 10° F. (5.6° C.) approach temperature are well known, and have been well known for many years. In spite of this, the problems remain.

It is an aim of the present invention to reduce or overcome the above mentioned problems.

Accordingly, the present invention provides a cooling tower for cooling a liquid with a gas, which cooling tower comprises:

(I) a vessel for receiving the gas passing upwardly and the liquid passing downwardly, with the liquid being hotter than the gas;

(ii) a gas outlet which is at a top portion of the vessel and which is for allowing the gas to pass out of the vessel;

(Ili) a support member which is positioned across a bottom portion of the vessel;

(iv) a plurality of apertures which are in the support member and through which the gas and the liquid are able to pass;

(v) a fluidised bed of packing elements on the support member;

(vi) liquid emitting means which is positioned in the vessel above the fluidised bed, and which is for emitting the liquid to be cooled such the liquid passes downwardly towards the fluidised bed;

(vii) pump means for pumping the liquid to the liquid spraying means; and (viii) a fan for blowing the gas upwardly through the fluidised bed, the cooling tower being such that it includes:

(ix) control means for controlling (a) the velocity of the gas through the vessel, and (b) the liquid to gas ratio in the vessel, whereby the fluidised bed is caused to operate at a tumbling rate which when combined with the selected pre-fluidised packing height causes an approach temperature of below 10° F. (5.6° C.);

(x) wherein the tumbling rate is controlled by a combination of controlled gas velocity and liquid to gas ratio creating turbulent mixing and tumbling of packing elements in the fluidised bed;

(xi) and wherein the pre-fluidised height of the fluidised bed is from 0.15-1.0 m, and the packaging elements being such that they are (a) packing elements which are eccentric and have their centre of gravity outside their geometrical centre, or (b) packing elements which are ellipsoidal, ovoidal, indented or protruding ovoidal, or indented or protruding ellipsoidal in shape.

The cooling tower of the present invention is based on the initial realisation that the size of the cooling tower is able to be reduced by the appropriate use of the fluidised bed of packing elements. The present invention is further based on the realisation that the fluidised bed of packing elements needs to be able to be controlled such that the fluidised bed is caused to operate at a tumbling rate which causes an approach temperature of below 10° F. This ability to achieve approach temperatures below 10° F. by use of a fluidised bed of packing elements in a cooling tower is surprising.

The use of a fluidised bed of packing elements is well known in gas scrubbing apparatus such for example as gas scrubbing columns. In such gas scrubbing apparatus, the gas is invariably hotter than the liquid, and thus the gas is not used to effect a cooling action. In spite of the well known use of fluidised beds of packing elements in gas scrubbing apparatus, industry does not generally use fluidised bed cooling towers. Also, industry has not been able to achieve approach temperatures below 10° F. using a fluidised bed of packing elements in a cooling tower. The use of the fluidised bed of packing elements in the cooling tower, in this case non-spherical elements, provides an increased surface area for permitting the cooling gas more effectively to contact the liquid to be cooled.

In addition to the basic realisation that the use of a fluidised bed of packing elements in a cooling tower increases the available surface area between the cooling gas and the hotter liquid to be cooled, there is the further inventive realisation that the fluidised bed needs to be controlled such that it operates at a tumbling rate which causes an approach temperature of below 10° F., and preferably 5° F. This control of the tumbling rate enables yet more effective cooling of the liquid with the gas.

The approach temperature can be reduced below 10° F. by increasing the bed height incrementally with operation within the control parameters, although too high a bed height leads to higher fan energy consumption.

A cooling tower which does not have the fluidised bed of packing elements and the control means for controlling the tumbling rate, would be such that it would be too large both in terms of diameter and height. However, with the use of the fluidised bed of packing elements and the control means for causing the fluidised bed to operate at a tumbling rate which causes an approach temperature of below 5° F., the cooling tower of the present invention is able to be reduced substantially in terms of its diameter and height. This leads to industrial advantages of the cooling tower being cheaper to produce because it is smaller in size, and also the cooling tower being such that it occupies less space than it would otherwise do.

Preferably, the control means for controlling (a) the velocity of the gas through the vessel, and (b) the liquid to gas ratio in the vessel, causes the fluidised bed to operate at a tumbling rate which when combined with the selected pre-fluidised packing height causes an approach temperature of below 5° F. (2.8° C.).

Preferably the pre-fluidised height of the fluidised bed is from 0.38 m-0.6 m. This may advantageously limit pressure loss and reduce fan energy.

The packing elements are preferably 20 mm-100 mm on their longest axis.

The packing elements preferably have densities of 150-450 kg/m$^3$. Preferably, the packing elements are in a pressure gradient range of 2,500-5,000 pascals per metre (Pa/m). This may advantageously achieve optimal bed tumbling.

The cooling tower may be one in which the control means controls the velocity of the gas through the vessel to 2-4 metres per second, and in which the control means adjusts the liquid to gas ratio such as to maintain it in the range 2-8 litres/m$^3$. Such operation of the control means gives good cooling of the liquid with the gas. The control means may if desired provide for other velocities of the gas through the vessel and/or other liquid to gas ratios.

The cooling tower may be one in which the control means is a digitally-operated control panel. Other types of control means may be employed.

The control means may operate such that:
1. treatable liquid flow volume is specified;
2. a liquid/gas ratio in the range 2-8 litres/m$^3$ is selected, to determine gas flow volume;
3. a gas velocity of between 2 m/s & 4 m is selected from which the vessel diameter is selected;
4. the NDU (Number of Diffusion Units) is calculated for approach temperature requirements, (for example <10° F.) from standard cooling tower integral formulae well known to designers;
5. expanded fluidised packing volume V (contact zone volume) is calculated from VDU (Volumetric Diffusion Unit) test data (multiplying VDU times NDU) for specific fluidised packing type; and
6. from packing element fluidising data there is calculated the requirement of fluidised packing element pre-fluidised (static) bed height.

The cooling tower may be one in which the apertures in the support member form a total area which is not less than 40% of the total area of the support member. This gives good gas flow through the support member and also good liquid flow through the support member. If desired, the apertures in the support member may form a total area which is less than 40%.

The apparatus may be one in which the pump means comprises a first pump for pumping the liquid to be cooled to the vessel at a position above the fluidised bed, and a second pump for pumping the cooled liquid from the vessel at a position below the fluidised bed, and in which the cooled liquid is returned by the second pump, for example to the industrial process. This re-circulation of the cooled liquid may be advantageous in process engineering applications where the cooled liquid is being used as a cooling agent, and where it is desired not to allow the cooled liquid to go to waste, for example where the cooled liquid is expensive and/or where the cooled liquid could be damaging to the environment.

Preferably the hollow packing elements are formed as hollow mouldings from plastics material. Other types of packing elements may be employed so that, for example, the packing elements may be in the form of sponges.

Where the packing elements are formed as hollow mouldings made from plastics material, then the packing elements may be moulded from a group of materials comprising compositions selected from one or more of polypropylene, polyethylene, ethylene-chloro-tri-fluro-ethylene and polyvinyl-difluoride.

The packing elements may be those manufactured under the Registered Trade Marks TurboPak and Turboid. Other types of packing elements may be employed but it is most preferable that there is an offset between the centre of gravity and centre of symmetry (COG/COS) in the packing elements such that they are eccentric.

The cooling tower may be one in which the liquid-distributing means is a spray means. The spray means may be one or more spray nozzles. Other types of liquid-distribution means may be used so that, for example, the liquid-distribution means may be through a distributor plate.

The cooling tower may be one in which a cooling tower according to any one of the preceding claims in which the fluidised bed of packing elements is such that the fluidised bed comprises packing elements which are each such that:
 (i) the packing element has a centre of gravity/centre of symmetry offset of between 50-95%;
 (ii) the packing element has at least one protrusion;
 (ii) the protrusion is at one end of the packing element; and
 (iv) the protrusion enhances the tumbling performance of the packing element in use in the fluidised bed when compared to a packing element of the same shape but without the protrusion.

Embodiments of the invention will now be described solely by way of example and with reference to the accompanying drawings in which.

Figure 1:
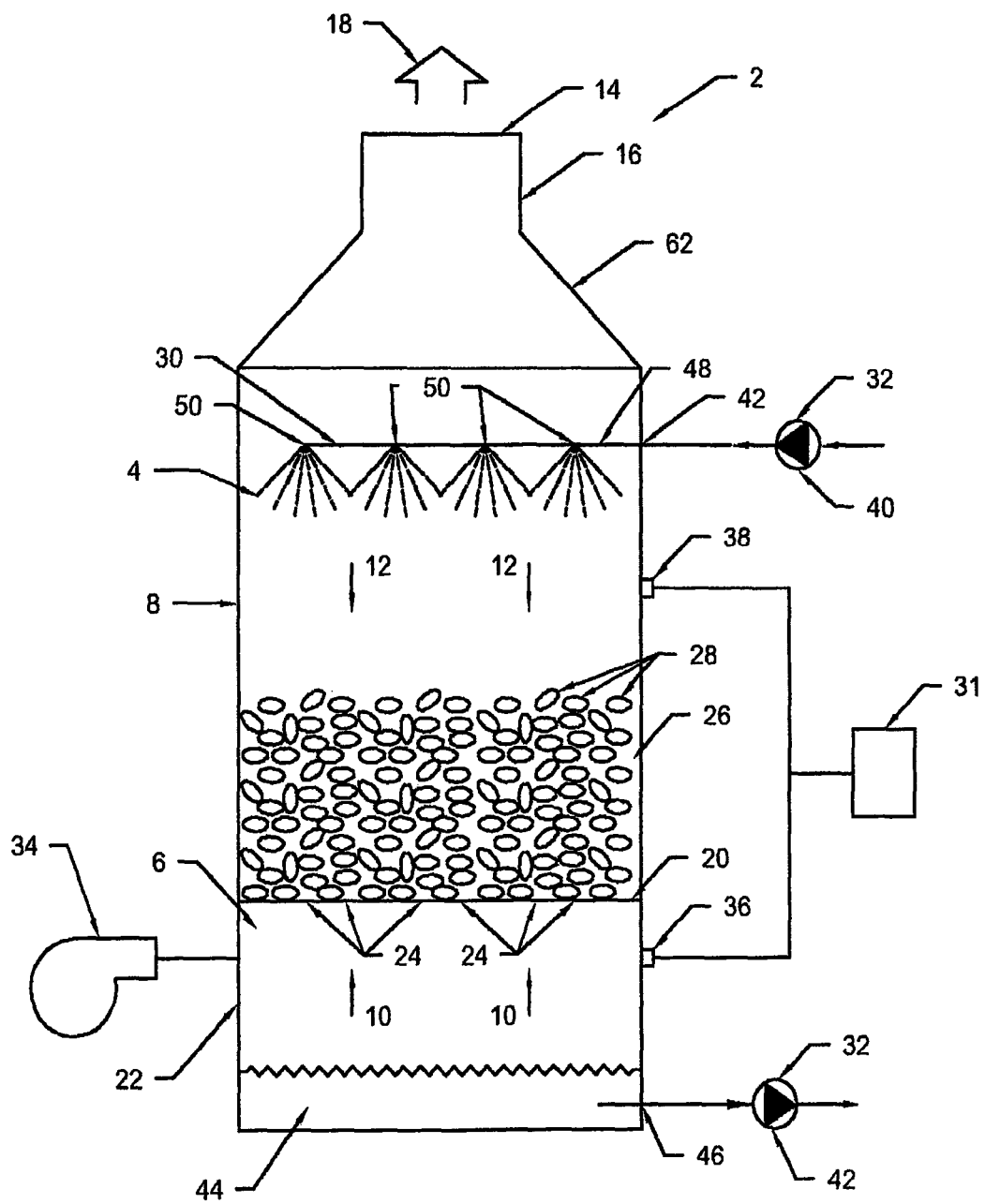
FIG. 1 shows a cooling tower for cooling a liquid with a gas.
Figure 2:
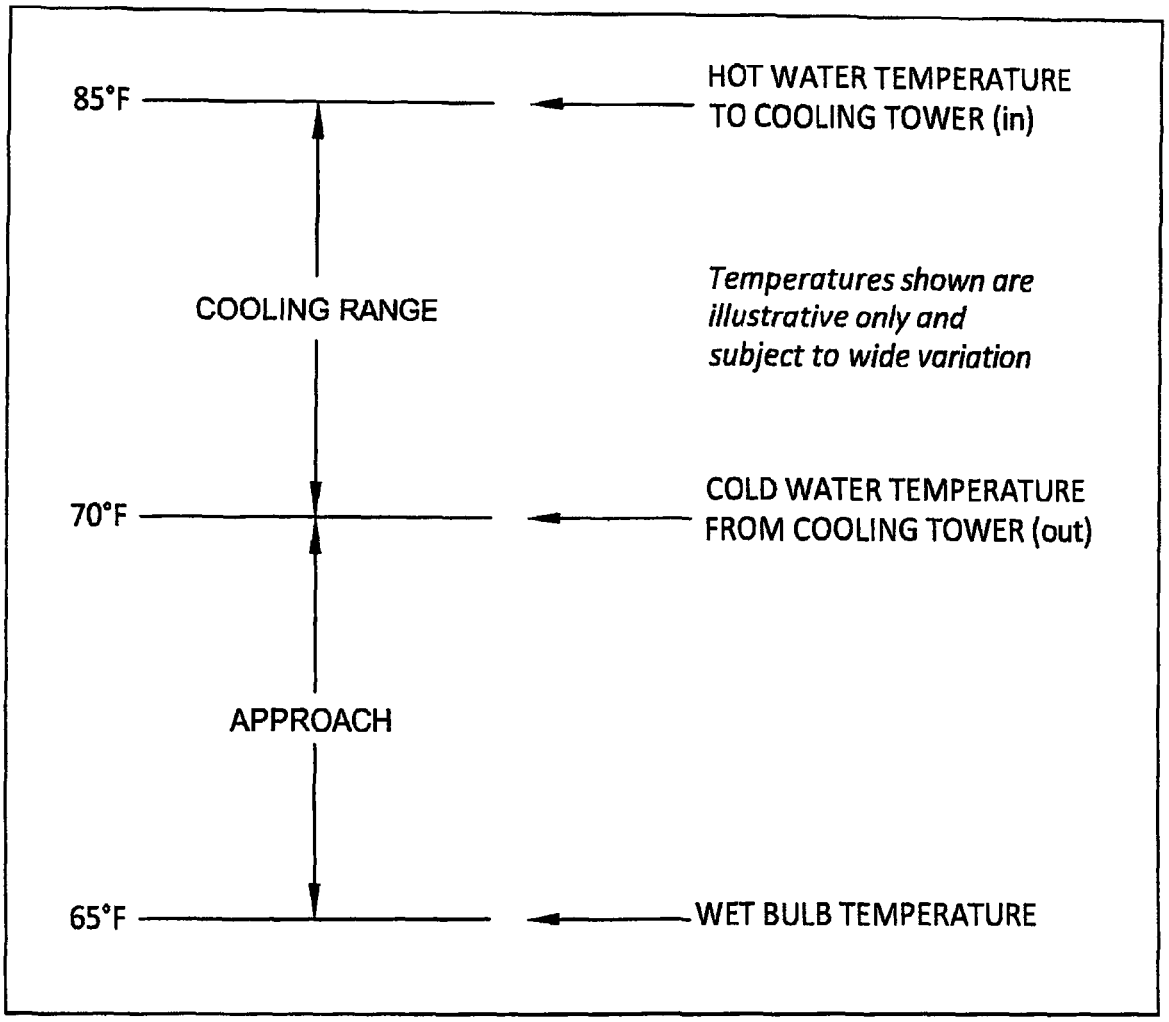
FIG. 2 is a diagrammatic representation of a cooling tower showing an illustrative relationship between overall temperature range and Approach in cooling tower operations.
Figure 3:
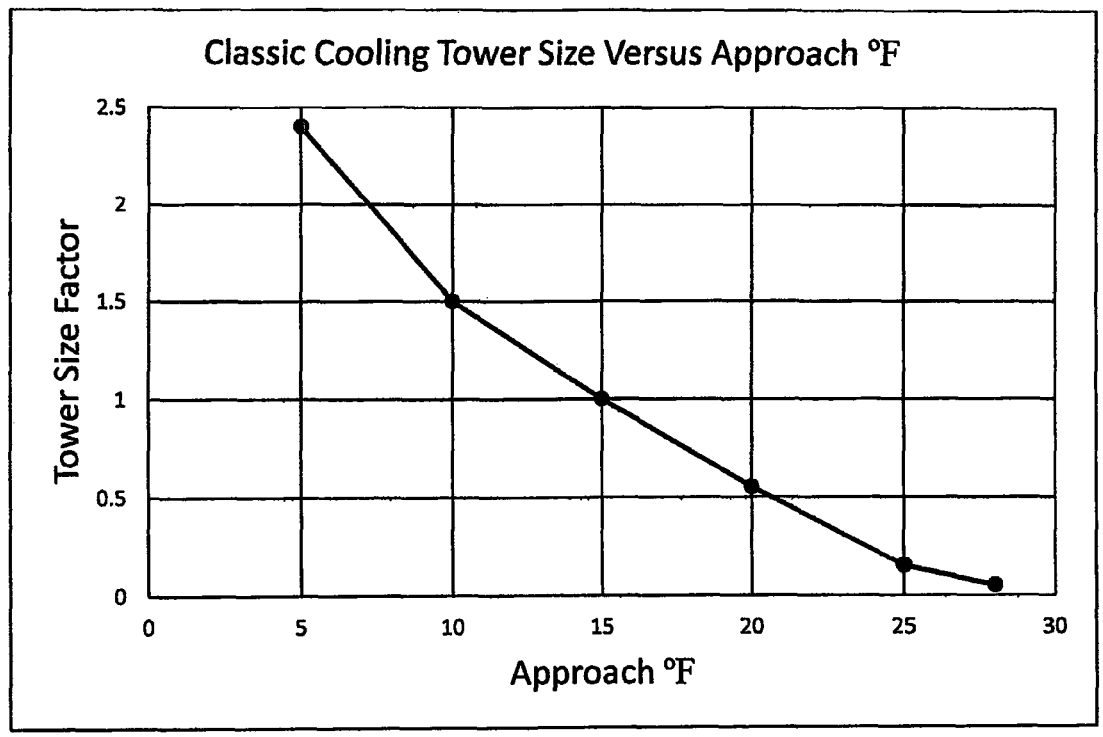
FIG. 3 is a graph illustrating the near asymptotic growth in classic cooling tower size with reduce approach.

Referring to FIG. 1, there is shown a cooling tower 2 for cooling a liquid 4 with a gas 6. The cooling tower 2 comprises a vessel 8 for receiving the gas 6 passing upwardly as shown by arrows 10. The vessel 8 is also for receiving the liquid 4 which passes downwardly as shown by arrows 12. A gas outlet 14 is provided at a top portion 16 of the vessel 8. The gas outlet 14 is for allowing the gas 6 to pass out of the vessel 8 as shown by arrow 18.

A support member 20 is positioned across a bottom portion 22 of the vessel 8. The support member 20 has a plurality of apertures 24. The apertures 24 allow the gas 6 and the liquid 4 to pass through the support member 20. A fluidised bed 26 of non-spherical packing elements 28 is provided on the support member 20.

The cooling tower 2 has liquid-distributing means 30 which is positioned in the vessel 8 above the fluidised bed 26. The liquid-distributing means 30 is for emitting the liquid 4 to be cooled such that the liquid 4 passes downwardly towards the fluidised bed 26. Pump means 32 pumps the liquid 4 to the liquid-distributing means 30. A fan 34 blows the gas 6 upwardly through the fluidised bed 26.

The cooling tower 2 is such that it can include a first pressure tapping 36 for determining a first gas pressure below the support member 20. A second pressure tapping 38 can be provided for determining a second gas pressure above the fluidised bed 26.

The cooling tower 2 includes control means 31 for controlling (a) the velocity of the gas 6 through the vessel 8, and (b) the liquid-to-gas ratio in the vessel 8, whereby the fluidised bed 26 is caused to operate at a tumbling rate which causes an approach temperature of below 5° F.

The cooling tower 2 is one wherein the tumbling rate is controlled by means of selecting the right L/G ratio and gas velocity to generate good tumbling across the fluidised bed 26.

The cooling tower 2 is also one wherein the gas pressure gradient is obtained by (a) measuring the height of the fluidised bed 26 during fluidisation, (b) obtaining pressure drop across the fluidised bed 26 during the fluidisation by subtracting the first gas pressure from the second gas pressure and (c) dividing the pressure drop by the height. Alternatively the pressure can be measured at the outlet of the fan 34 shown in FIG. 1.

Preferably, the cooling tower 2 is one in which the control means 31 controls the velocity of the gas 6 through the vessel 8 to 2-4 metres per second, and in which the control means 31 adjusts the liquid to gas ratio between 2 and 8 litres/m$^3$. In another embodiment of the invention control means maintaining the pressure gradient in the range 2500-5000 Pascals per metre. The control means 31 may be any suitable and appropriate control means, for example a digitally operated control means.

As can be seen from FIG. 1, the pump means 32 comprises a first pump 40 for pumping the liquid to be cooled to the vessel 8 at a position 42 above the fluidised bed 26. The pump means 32 also comprises a second pump 42 for pumping cooled liquid 44 from the vessel 8 at a position 46 below the fluidised bed 26. The cooled liquid is returned to the industrial process or to effluent by the pump means 32 through the vessel 8 as can be appreciated from FIG. 1.

The liquid-distributing means 30 is by spray nozzles comprising a pipe 48 and a plurality of spray heads 50 in the pipe 48.

The fan 34 provides the cooling gas in the form of cooling air. The liquid distributing means 30 provides the liquid to be cooled in the form of water. After cooling the liquid 4, the gas 6 leaves the vessel 8 in a moist condition due to the gas 6 having acquired moisture from the liquid 4.

The invention will now be described with reference to FIGS. 2-5 and in terms of concept, technical advantages and economic advantages.

Referring to FIGS. 2-5, the present invention is concerned with overcoming technical, size and economic limitations in cooling towers.

Classical cooling towers using spray or other liquid distribution systems, and fixed or structured packings as a contact medium, cannot easily economically achieve low approach temperatures below about 10° F. (5.6° C.). The approach temperature is the difference between inlet gas temperature and outlet liquid temperature. The difference between outlet liquid temperature and inlet (wet bulb) gas temperature is also sometimes referred to simply as Approach.

In fact, the size of a known contact tower varies inversely with 'Approach'. The contact tower becomes uneconomically large both in diameter and height terms below approach temperatures. The 'Approach' also varies inversely with air volume flow which exacerbates the increasing size problem as high air to water ratios, and consequently larger diameter cooling towers are also required to achieve low approach temperatures.

The combination of these two effects produces a near asymptotic inverse relationship between classical column size and 'Approach;

The present invention may enable known counter-current liquid cooling towers to be retrofitted to overcome their otherwise disadvantages and limitations.

An object of the invention is to economically drive approach temperatures to below 10° F. and preferably below 5° F. whilst minimising the cooling tower size and air volume flow requirements by comparison with such known cooling towers.

In short the invention serves to provide compact highly efficient and economical cooling towers with very low approach temperatures currently unavailable in the industrial market. An additional advantage is that the cooling tower is able to be completely non-fouling due to the highly turbulent churning and tumbling nature of the fluidised bed of continually colliding eccentric and/or indented packings elements. This allows the use of particulate laden gases or liquid slurries, and overcomes the build-up of a bio-film, which can lead to *legionella* in known cooling towers. It also offers better performance for liquid cooling in hotter or humid climates, where known cooling towers become less efficient with even more difficulty in achieving low approach temperature.

In an ideal case to maximise heat transfer efficiency, the cooling tower designer may drive the approach temperature, ΔT, towards zero. To achieve this it is necessary to evaporate or condense liquid into or from the gas, the condensing occurring at the liquid interface, such that the relative humidity of the gas is driven towards 100% where the gas dry and wet bulb temperatures are almost identical, known as a "pinch".

However the only way to overcome the asymptotically increasing effect on the tower or transfer zone height Z and resultant high capital expenditure, is by countering with equally rapidly increasing values of the combined volumetric heat and mass transfer coefficient $K_x a$, where '$K_x$' is the transfer coefficient and 'a' the interfacial contact area between gas and liquid. This is something simply not attainable in known cooling towers employing packed bed, tray or spray type technologies.

As a general design principle, as the liquid to gas ratio L/G rises in a cooling tower, so the $K_x a$ value should also rise, which should boost the performance of individual packing or tray designs.

However both packed towers and tray towers are highly vulnerable to a phenomenon known as "flooding" which limits the amount of liquid that can flow downwards against upcoming gas. This means that low L/G (liquid to gas) or high A/W (air to water) ratios tend to have to be used to avoid flooding or "loading" (onset of flooding) conditions, and this also keeps $K_x a$ values low. As a result, typical known cooling towers are designed with L/G in the range of 0.3-3.0 litres/m$^3$.

The only practical way for designers of known cooling towers to increase L/G ratios whilst avoiding loading/flooding, is by lowering the upward gas velocity. This in turn requires the diameter of the cooling tower to be increased thereby returning the designer back to the same problem.

One known commonly used way of comparing the performance of cooling or heat recovery systems is by using the Height of Diffusion Unit, HDU.

HDU is a direct function of the packing, cooling tower internals, and spray nozzles Comparisons are shown below in Table 1 between the data of Parekh, Chemical Engineering, MIT, 1941, for different packings and data for TurboPak®—38 mm×32 mm, indented eccentric hollow 'egg' or 'acorn' type shapes, fluidised bed packing data from tests using a full-scale trial cooling tower.

The TurboPak® packings trial was undertaken using a 6 foot, i.e. 1.829 m, diameter column cooling up to 500 USgpm, 112.5 m³/hr, of process water from 132° F., 55.6° C., to 106° F., 41.1° C., using ambient air at 82° F., 27.8° C., with a RH of at least 90%.

The results relative to the Parekh data for highly efficient smaller 0.5" (13 mm) & 1" (25 mm) diameter packings have been calculated, using the format below, which effectively contrasts the $K_xa$ values fluidised bed packings against the known systems using the relationship between HDU & $K_xa$ as follows. Elaborating further;

$$HDU=L/(K_xa)$$

Where, $K_xa$=Combined Mass/Heat-Transfer Coefficient kg/m³·s or lb/ft³·s and $L$=liquid flow-rate–kg/m²·s or lb/ft²·s As the HDU increases, so the height of the cooling or heat recovery tower increases for a given or expected performance or NDU because;

$$Z=HDU \times NDU$$

Where,

NDU is the Number of Diffusion units, which rises logarithmically or asymptotically as the tower is designed to get closer to 'pinch' by reducing the approach temperature, ΔT, and approach water vapour pressure ΔP.

To economically compare different systems designed to achieve the same cooling or heating efficiency, same NDU value, this equation is modified as follows;

$$Z=V/A=HDN \times NDU$$

Where V=tower contact zone volume, and
A=tower cross sectional area
Re-arranging, V=A×HDU×NDU
The two systems may be composed as follows:

$$V2N1=A2 \times HDU2/A1 \times HDU1$$

Rewriting the term A×HDU as VDU or Volumetric Diffusion Unit this becomes $$V2/N1-VDU2/VDU1$$

Table 1 compares fixed packing data against the TurbEx® fluid bed results for TurboPak® indented hollow packing elements using expanded bed height volumes.

The ratio of the typical gas velocities for the fluid and packed bed systems is 4, which means that the A value ratio in the calculated VDU values is also 4.

TABLE 1

VDU (m³) v L/G (litres/m³) for different Systems & Packings

Fixed Packings ~0.9 m/s
Fluid Bed ~3.6 m/s

| System/Packing | Volumetric Diffusion Unit (m³) | | |
|---|---|---|---|
| | L/G = 2 | L/G = 6 | L/G = 12 |
| 1" Raschig Ring | 0.67 | 0.98 | 1.44 Flood Point |
| 1.5" Raschig Ring | 0.73 | 1.24 | 2.05 Loading |
| 2" Raschig Ring | 0.80 | 1.52 | 2.60 |
| 0.5" Berl Saddle | 0.48 | 0.98 | 1.54 Flood Point |

TABLE 1-continued

VDU (m³) v L/G (litres/m³) for different Systems & Packings

Fixed Packings ~0.9 m/s
Fluid Bed ~3.6 m/s

| System/Packing | Volumetric Diffusion Unit (m³) | | |
|---|---|---|---|
| | L/G = 2 | L/G = 6 | L/G = 12 |
| 1" Berl Saddle | 0.62 | 0.99 | 1.61 Loading |
| 1.5" Berl Saddle | 0.76 | 1.50 | 2.39 |
| TurboPak ® Expanded | 2.66 | 0.52 | 0.35 |

Fluid bed packings themselves can be operated at low or high velocities and cannot be flooded, which offers great scope to a designer in reducing diameters by using higher gas velocities or retrofitting existing low gas velocity columns. Avoidance of flooding also produces the benefit that there is no upper limit on L/G.

Figure 4:
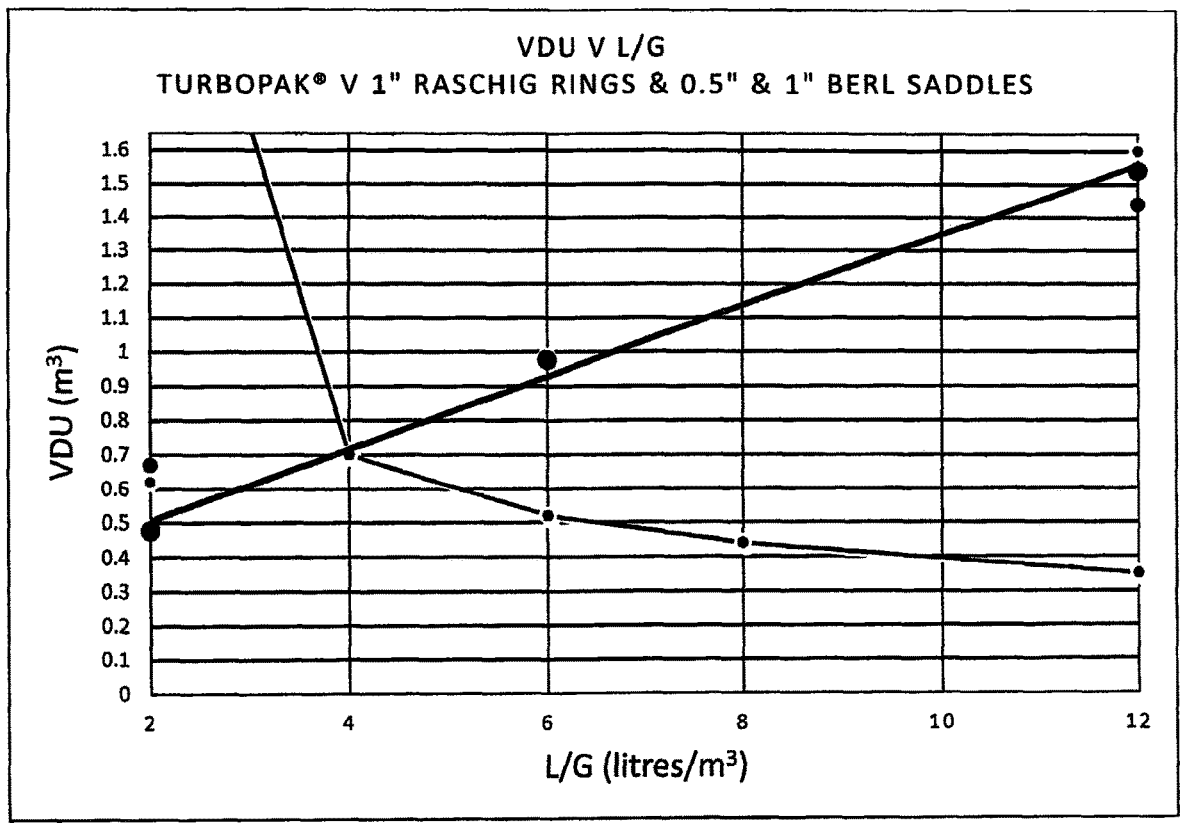
FIG. 4 is a graph illustrating relative VDUs (Volumetric Diffusion Unit), equivalent tower cross-section for eccentric indented fluid bed versus fixed packings.

What both Table 1 & FIG. 4 show clearly is that the VDUs for fixed packings increase with increasing L/G whereas those for TurboPark® fluid bed packings surprisingly and beneficially do the opposite.

Whereas the VDU values in the table for the fluid bed case are from a full-scale trial, values for the best performing fixed packings are based on smaller scale trials using low bed heights of only 15" to 24" (0.38 to 0.6 m) which are idea from a liquid flow distribution perspective. So fixed pack VDUs would become larger in full scale tower applications, particularly if the tower is poorly designed from a flow dynamics viewpoint. This becomes particularly significant as tower diameters increase to accommodate larger gas and liquid flow rates due to the susceptibility of packed towers and spray towers to channelling with gas and liquid flow mal-distribution.

Figure 5:
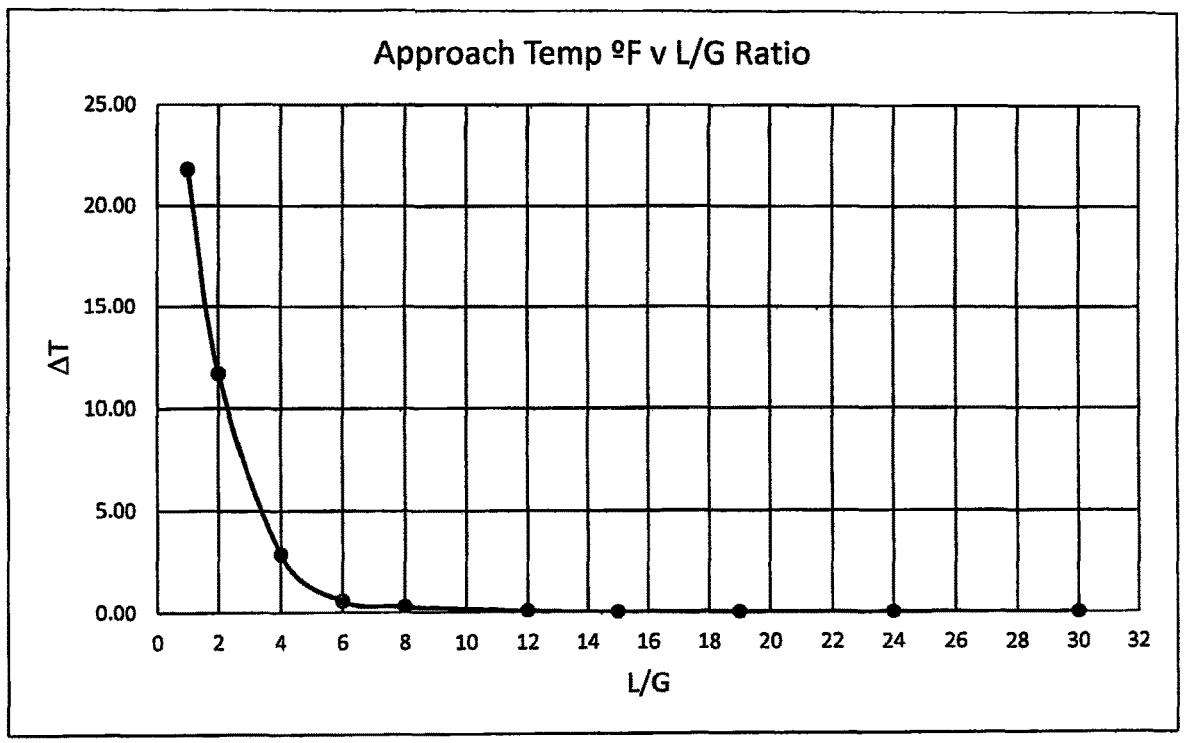
FIG. 5 is a graph illustrating approach temperature (° F.) for indented ovoidal packing elements known under the Trade Mark TurboPak versus L/G ratio, litres/m$^3$, at 3.6 m/s gas velocity.

The values shown in Table 1 and FIGS. 4 and 5 show the surprising capacity of TurbEx fluid bed system to reduce both VDUs and Approach at L/G values above about 2-3 litres/m³ giving highly significant reductions in both the tower volume and the air volume flow in favour of the TurboScrubber® technology. As L/G is increased above about 2 litres/m³, the gains in volume and air-flow reduction accumulate up to around an L/G of 8 where-after there is little additional gain.

FIG. 5 itself shows the surprising asymptotic reduction in Approach Temperature with increasing L/G ratio for the TurboPak® packings at a gas velocity of 3.6 m/s during the aforementioned trials. It is clear that above UG ratios of 2, the ΔT reduces exponentially below the often targeting 10° F. value and then the key 5° F. difference although little further gain in ΔT is achievable above L/G ratios of about 8.

The combination of these two advantageous effects of reductions in tower volume and air-flow requirements means that very tight Approach temperatures can be achieved in columns with at least 30% to 50% less volume than classical systems particularly in the 2-8 UG range.

Even above an L/G of 8, the possibility to treat large liquid or gas flows in a single column with high L/G, low A/W (air to water ratio), also becomes available to a tower designer where classical systems are likely to require multiple large towers.

Figure 6:
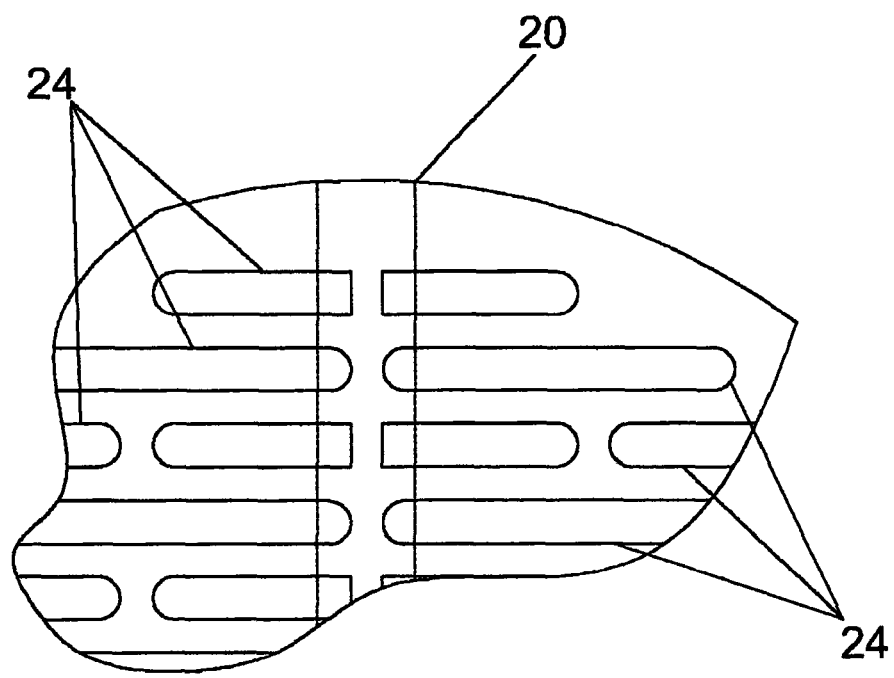
FIG. 6 is a top perspective view of part of a support member for use in a cooling tower of the present invention.

Referring now to FIG. 6, there is shown a portion of a support member 20 which may be the support member 20 shown in the cooling tower 2 in FIG. 1, or it may be an alternative to the support member 20 shown in the cooling tower 20 of FIG. 1. For simplicity of illustration, similar parts as in FIGS. 1 and 6 have been given the same reference numerals for ease of comparison and understanding.

In FIG. 6, the apertures 24 in the support member 20 form a total area which is not less than 40% of the total area of the support member 20.

Figure 7:
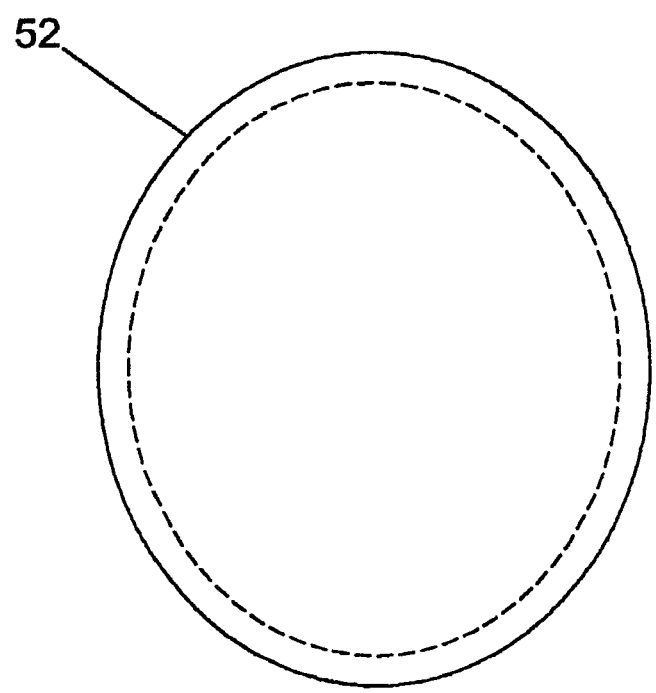
FIG. 7 shows an alternative packing element to the packing elements shown in FIG. 1.

FIG. 7 shows an alternative non-spherical packing element 52 to the packing element 28 shown in FIG. 1. As can be seen, the packing element 52 is ellipsoidal.

Figure 8:
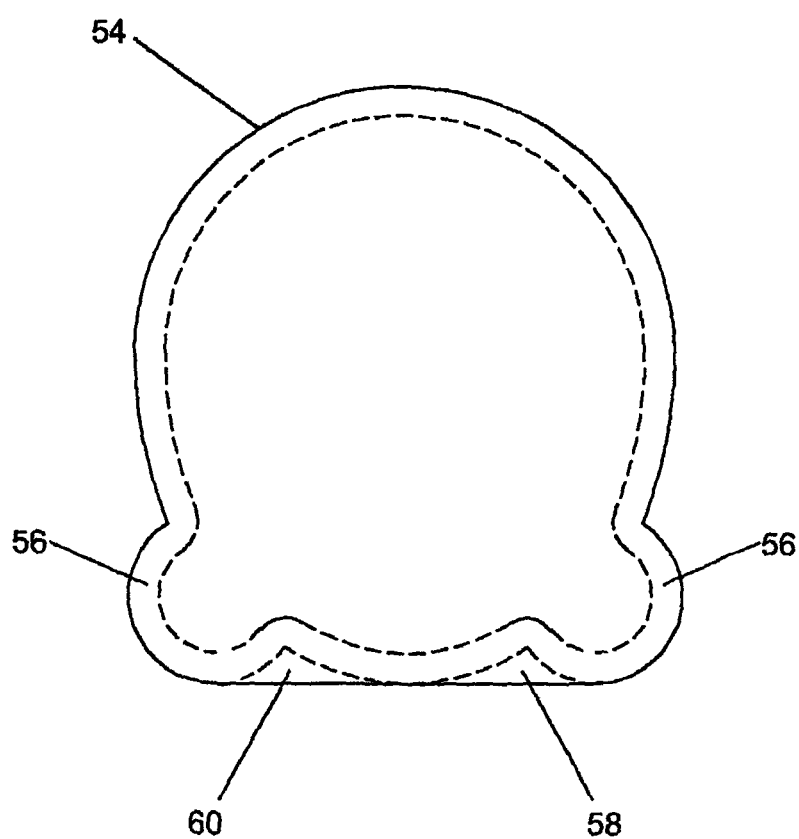
FIG. 8 shows a further alternative packing element to the packing elements shown in FIG. 1.

FIG. 8 shows a non-spherical packing element 54 which is an alternative to the packing elements 28, 52. The packing element 54 is like the packing element 52 except that:

(i) the packing element 54 has a centre of gravity/centre of symmetry offset of between 50-95%;

(ii) the packing element 54 has at least one protrusion 56 and in fact has two of the protrusions;

(iii) the protrusions 56 are at one end 58 of the packing element 54; and (iv) the protrusions 56 enhance the tumbling performance of the packing element 54 in use of the fluidised bed 26 when compared to a packing element of the same shape but without the protrusions 56. The tumbling performance of the packing element 54 is further improved by the presence of at least one concave recess 60.

As shown in FIG. 8, there are preferably two of the concave recesses 60. Also preferably, each concave recess 68 is proximate to its adjacent protrusion 56.

The packing elements 28, 52, 54 are formed as hollow mouldings from a plastics material. Preferably, the packing elements 28, 52, 54 are moulded from a group of materials comprising compositions selected from one or more of polypropylene, polyethylene, ethylene-chloro-tri-fluro-ethylene and polyvinyl-difluoride.

The control means 31 controls (a) the velocity of the gas 6 through the vessel 8, and (b) the liquid-to-gas ratio in the vessel 8, whereby the fluidised bed is caused to operate at a tumbling rate which causes the approach temperature to reduce to below 5° F. Preferably, the control means 31 controls the velocity of the gas 6 through the vessel 8 to 2-4 metres per second. Also preferably, the control means 31 adjusts the liquid to gas ratio such as to maintain it between 2 and 8 litres/m$^3$. Within these ranges the pressure gradient should be maintained in the range 2500-5000 Pascals per metre of static bed height.

In the above description, the approach temperature of 5° F. equates to 2.8° C. Other imperial measures of HDU equate to metres in metric measures or feet in Imperial units.

It is to be appreciated that the embodiments of the invention described with reference to the accompanying drawings have been given by way of example only and that modifications may be effected. Thus, for example, the cooling tower 2 may be of a different shape to that shown. The gas outlet 14 may be at a different position to that shown in FIG. 1 where the gas outlet 14 is shown at the top of a frusto-conical portion 62 of the vessel 8. The cooling air may be another gas, for example oxygen, nitrogen or carbon dioxide. The cooled liquid may be other than water, for example oil. More than one fan 34 may be employed. The control means 31 may be arranged to take readouts from the first and second pressure tappings 36, 38, the pump liquid and fan gas flow-rates and by hard wiring or wirelessly. Individual components shown in the drawings are not limited to use in their drawings and they may be used in other drawings and in all aspects of the invention. The invention also extends to the individual components mentioned and/or shown above, taken singly or in any combination.

The invention claimed is:

1. A cooling tower for cooling a liquid with a gas, which cooling tower comprises:

(i) a vessel for receiving the gas passing upwardly and the liquid passing downwardly, with the liquid being hotter than the gas;

(ii) a gas outlet which is at a top portion of the vessel and which is for allowing the gas to pass out of the vessel;

(iii) a support member which is positioned across a bottom portion of the vessel;

(iv) a plurality of apertures which are in the support member and through which the gas and the liquid are able to pass;

(v) a fluidised bed of packing elements on the support member;

(vi) liquid emitting means which is positioned in the vessel above the fluidised bed, and which is for emitting the liquid to be cooled such the liquid passes downwardly towards the fluidised bed;

(vii) pump means for pumping the liquid to the liquid spraying means; and (viii) a fan for blowing the gas upwardly through the fluidised bed, the cooling tower being such that it includes:

(ix) control means for controlling (a) the velocity of the gas through the vessel, and (b) the liquid to gas ratio in the vessel, whereby the fluidised bed is caused to operate at a tumbling rate which when combined with a selected pre-fluidised packing height causes an approach temperature of below 10° F. (5.6° C.), (x) wherein the tumbling rate is controlled by a combination of controlled gas velocity and liquid to gas ratio creating turbulent mixing and tumbling of packing elements in the fluidised bed;

(xi) and wherein the pre-fluidised height of the fluidised bed is from 0.15-1.0 m, and the packing elements being such that they are (a) packing elements which are eccentric and have their centre of gravity outside their geometrical centre, or (b) Packing elements which are ellipsoidal, ovoidal, indented or protruding ovoidal, or indented or protruding ellipsoidal in shape.

2. A cooling tower according to claim 1 in which the control means for controlling (a) the velocity of the gas through the vessel, and (b) the liquid to gas ratio in the vessel, causes the fluidised bed to operate at a tumbling rate which when combined with the selected pre fluidised packing height causes an approach temperature of below 5° F. (2.8° C.).

3. A cooling tower according to claim 1 wherein in the pre-fluidised height of the fluidised bed is from 0.38-0.6 m.

4. A cooling tower according to claim 1 in which the packing elements are 20-100 mm on their longest axis.

5. A cooling tower according to claim 1 in which the packing elements have densities of 150-450 kg/m$^3$.

6. A cooling tower according to claim 1 in which the packing elements are fluidised in a pressure gradient range of 2,500-5,000 pascals metre (Pa/m).

7. A cooling tower according to claim 1 in which the control means controls the velocity of the gas through the vessel to 2-4 metres per second, and in which the control means adjusts the liquid to gas ratio such as to maintain it in the range 2-8 litres per m$^3$.

8. A cooling tower according to claim 1 in which the control means is a digitally-operated control panel.

9. A cooling tower according to claim 1 in which the apertures in the support member form a total area which is not less than 40% of the total area of the support member.

10. A cooling tower according to claim 1 in which the pump means comprises a first pump for pumping the liquid to be cooled to the vessel at a position above the fluidised bed, and a second pump for pumping cooled liquid from the vessel at a position below the fluidised bed, and in which the cooled liquid is returned by the second pump.

11. A cooling tower according to claim 1 in which the liquid emitting means is a spray means.

12. A cooling tower according to claim 11 in which the spray means comprises a plurality of spray nozzles.

13. A cooling tower according to claim 1 in which the fluidised bed of packing elements is such that the fluidised bed comprises packing elements which are each such that:
   (i) the packing element has a centre of gravity/centre of symmetry offset of between 50-95%;
   (ii) the packing element has at least one protrusion;
   (iii) the protrusion is at one end of the packing element; and
   (iv) the protrusion enhances the tumbling performance of the packing element in use in the fluidised bed when compared to a packing element of the same shape but without the protrusion.

\* \* \* \* \*